United States Patent [19]

Funk

[11] 4,169,603
[45] Oct. 2, 1979

[54] SHAFT PACKING, IN PARTICULAR FOR USE IN COLLOID MILL

[75] Inventor: Friedrich Funk, Matzendorf, Switzerland

[73] Assignee: Meyer AG Zuchwil, Zuchwil, Switzerland

[21] Appl. No.: 804,349

[22] Filed: Jun. 7, 1977

[30] Foreign Application Priority Data

Jun. 9, 1976 [CH] Switzerland .................. 7237/76
Apr. 13, 1977 [CH] Switzerland .................. 4552/77

[51] Int. Cl.² ........................................ F16J 15/34
[52] U.S. Cl. ............................ 277/59; 277/22; 277/96.2
[58] Field of Search ........... 277/15, 22, 59, 77, 277/81 R, 96 R, 96.1, 96.2, DIG. 6

[56] References Cited

U.S. PATENT DOCUMENTS

| | | | |
|---|---|---|---|
| 2,425,209 | 8/1947 | Snyder et al. | 277/96.2 |
| 2,432,684 | 12/1947 | Roshong | 277/16 |
| 2,628,852 | 2/1953 | Voytech | 277/15 |
| 2,994,547 | 8/1961 | Dollun et al. | 277/96.2 X |
| 3,068,014 | 12/1962 | Wilkinson | 277/68 |
| 3,075,780 | 1/1963 | Mayer | 277/59 |
| 3,357,706 | 12/1967 | Wilkinson | 277/22 X |
| 3,391,942 | 7/1968 | Wilson | 277/96.2 X |
| 3,391,964 | 7/1968 | Miyake | 277/92 X |
| 3,515,393 | 6/1970 | Metcalfe | 277/96.2 X |
| 3,738,667 | 6/1973 | Symons | 277/96.1 |
| 3,874,680 | 4/1975 | Mustol et al. | 277/96 R |
| 3,905,605 | 9/1975 | Hubner | 277/22 |

Primary Examiner—Robert S. Ward, Jr.
Attorney, Agent, or Firm—Imirie & Smiley

[57] ABSTRACT

The present invention refers to a shaft packing, in particular for use in colloid mill, with a sliding and a counter ring, one of the rings is made of a hard material having a Vickers hardness of at least 1,000 kp/mm2 and the other is made of a soft material having a hardness of 100 Shores at the most. In particular the surfaces in contact with each other are cooled and lubricated by a liquid. In order to further increase the life of said packing, the counter ring is displaceable and adjustable from the outside without being dismantled and the sliding ring holder is provided with centrifugal blades for keeping the material to be milled and milling bodies away from the contact surfaces of said rings. The construction of said shaft packings allows its use in a horizontally arranged colloid mill, wherein the material being milled flows in the direction of the widening cone.

20 Claims, 9 Drawing Figures

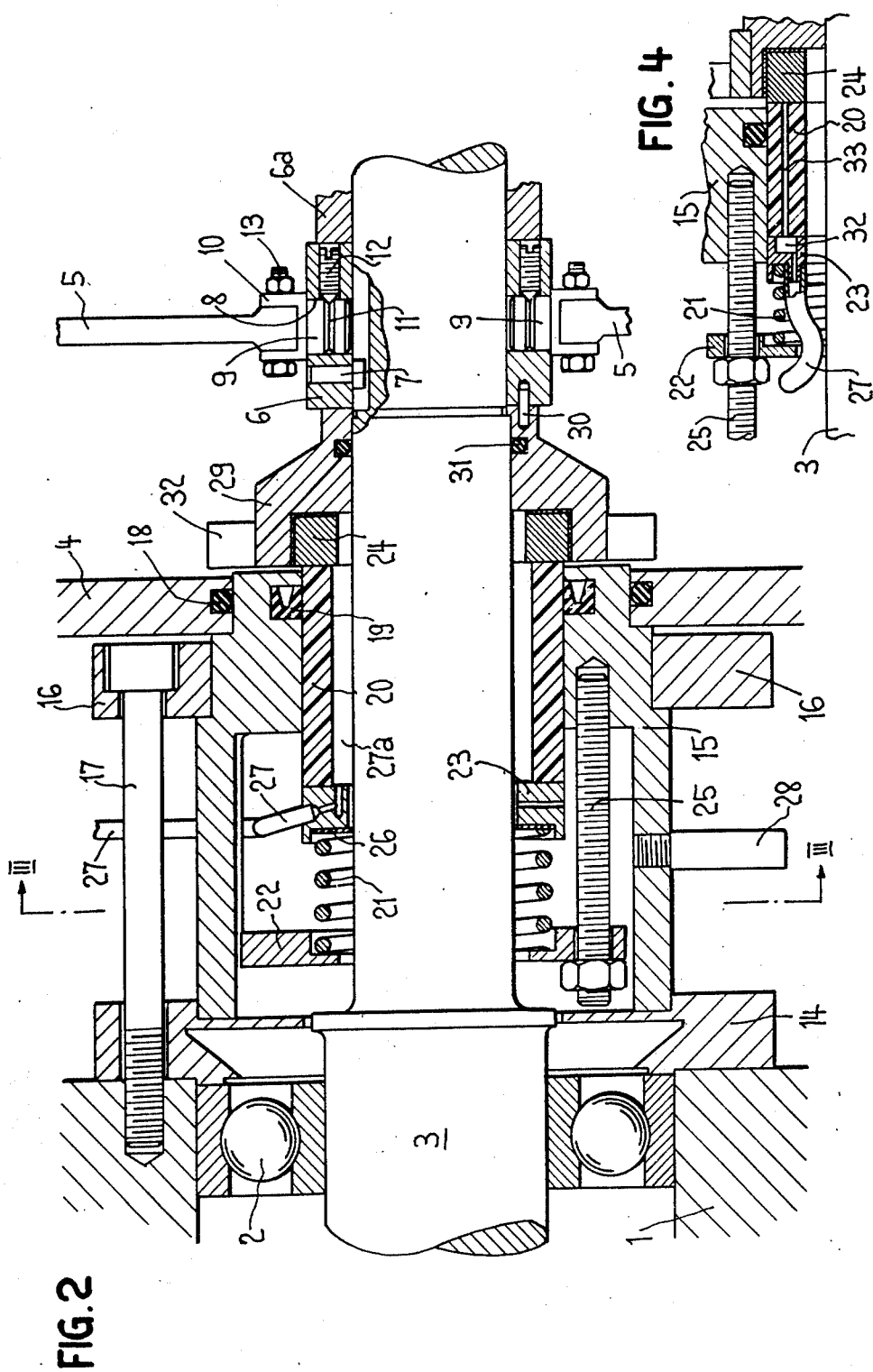

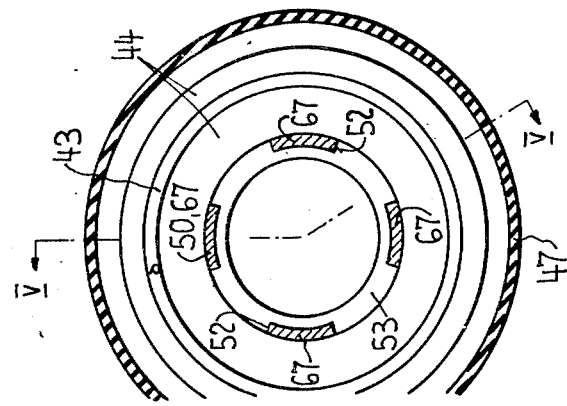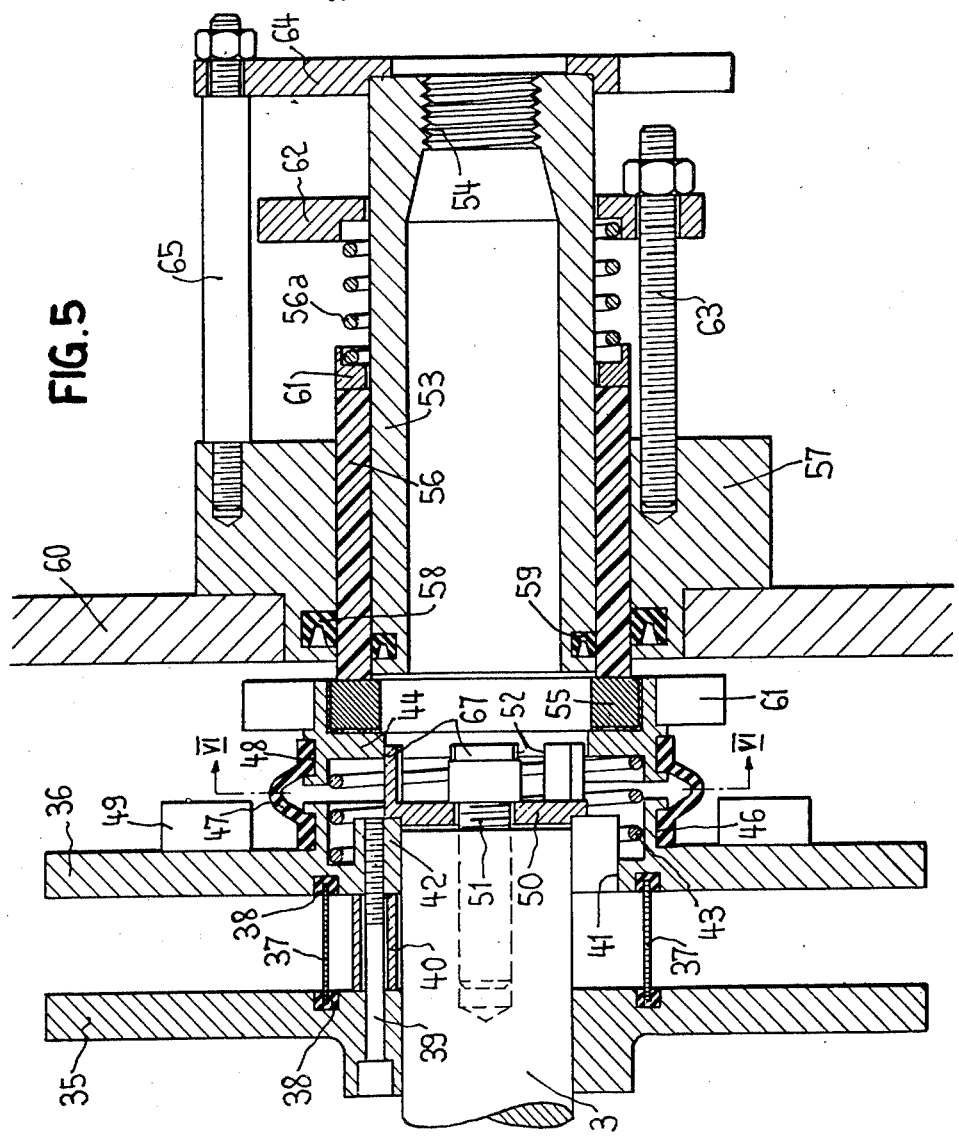

SHAFT PACKING, IN PARTICULAR FOR USE IN COLLOID MILL

The present invention relates to a shaft packing, more especially for use in an agitator or colloid mill, having a sliding ring and counter ring.

Shaft packings comprised of two rings in sliding engagement on each other are available in various shapes and of various materials. Besides the sealing property, it is the life of one or both partners which especially determines the usability and economy of such a shaft packing.

It is therefore an object of the present invention to supply a shaft packing which is distinguished by a long life.

According to the present invention there is provided a shaft packing, especially for use in an agitating or colloid mill, having a sliding and a counter ring, characterised by the feature that one of the rings is made of a hard material having a Vickers hardness of at least 1000 kp/mm$^2$ and the other is made of a soft material having a hardness of 100 Shores at the most, and that both rings are moistened by a cooling and lubricating liquid especially or at least at their surfaces in contact with each other.

In a preferred embodiment, the life of the above-characterised shaft packing may be substantially further increased by the fact that the hard sliding ring is secured to the shaft and the soft counter ring is adjustable from the outside and subject to spring pressure and is urged against the sliding ring.

A further increase of the life of the packing is attained in that the sliding ring holder for the purpose of keeping material being ground and/or grinding members away from the contact surfaces is provided at the end face and on the circumference with centrifugal blades.

A further embodiment is characterised by the feature that between the counter ring and the housing an angled, resilient packing is provided pressed against the counter or backing ring by a spring ring.

The invention will be described further, by way of example, with reference to the accompanying drawings, in which:

FIG. 2 is a longitudinal section showing a shaft packing in a colloid mill;

FIG. 4 is a enlarged fragmentary detail of an alternative embodiment of the cooling and lubricating liquid supply means shown in FIG. 2;

FIG. 5 is a sectional view of an alternative embodiment of a shaft packing and is taken on the line V—V of FIG. 6;

FIG. 6 is a section taken on the line VI—VI of FIG. 5;

Figure 3:
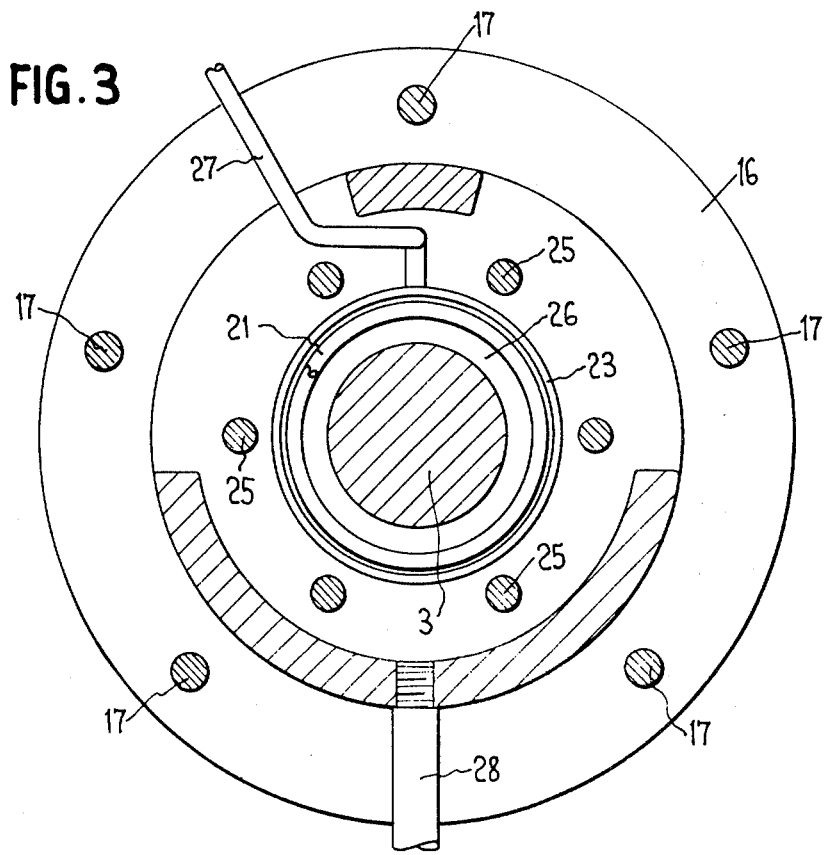
FIG. 3 is a section taken on the line III—III of FIG. 2.

FIGS. 2 and 3 show a shaft packing on the inlet or drive side of a colloid mill. In a frame 1 a shaft 3 is mounted by means of ball bearings 2. Shaft 3 projects through an end face 4 of the vessel portion of the colloid mill. Agitating vanes 5 are indicated mounted on the shaft 3 and those illustrated are secured in a holder which is pivotally and securably retained in a boss 6 as described in the U.S. patent application Ser. No. 701,030, filed June 29, 1976. Boss 6 is secured to shaft 3 by means of a safety bolt 7 and a spacer 6a, and has bores 8 formed therein into each of which a pin 9 of a vane holder can be inserted. A U-shaped profile 10 is connected to the pin 9 and the parts 9 and 10 together thus form a holder. The pin 9 has an annular groove 11 in which a securing screw 12 engages to prevent rotation and axial displacement of the holder. The outwardly projecting shanks of the U-shaped profile 10 and the vane 5 each have two holes through which securing screws 13 project and secure the vane on the holder. It is, of course, also possible and within the scope of the invention to provide other vanes or grinding stones.

A bearing clamping lid 14 abutts against the frame 1 and is connected to the frame 1, via the housing 15 and flange 16, by means of screws 17. The end wall 4 is sealed relative to the housing 15 by an O-ring 18. A backing or counter ring 20 is sealed between the housing 15 and the shaft 3 by a sleeve 19. The ring 20 in the example is made of polyurethane, i.e. a plastics material, although it would be quite possible to use other relatively soft materials, such as carbon, whereby this counter ring is either cut-open or made in two parts to facilitate its replacement. The counter ring 20 is pressed against the sliding ring 24 by a spring 21 which is retained at one end by a displaceable centre rest 22 and at the other end by a spring guide 23 which is also displaceable. The sliding ring 24 is preferably made of ceramic material, but for specific uses of the colloid mill other hard materials, such as sintered hard metals or the like, may be used. The centre rest 22 is pressed in the direction of the end wall 4 by means of setting screws 25 whereby on the one hand the spring 21 is compressed and above all the counter ring 20 reset upon wearing.

A locking ring 26 is provided at the spring guide 23 so as to produce a slight excess pressure of the cooling and lubricating liquid in the cooling chamber 27a formed between the counter ring 20 and the shaft 3 and to retain liquid when the machine stops.

An inlet pipe 27 is shown leading from above and by means of which a cooling and lubricating liquid (normally water) may be supplied to the spring guide 23 and into the chamber 27a and from there between the counter ring 20 and sliding ring 24. The outlet pipe 28, at the bottom of the drawing, has an outlet opening 28a. The wetting of the surfaces and especially of the boundary surface between counter and sliding ring is a decisive factor in order considerably to increase the life of the two sealing or packing rings. As a result of this cooling and lubricating system, particularly favourable frictional and sealing material combinations may be used. In particular, it has been found that the use of very hard and relatively soft combinations provides considerable advantages. Experiments with ceramics and polyurethane rings after many hundreds of hours operation have failed to show any noticeable wear. The sliding ring 24 is retained by a sliding ring holder 29 which is secured by bolts 30 to the boss 6 and sealed by means of an O-ring 31 relative to the shaft 3. On the sliding ring holder 29, a centrifuge ring 32 is provided to prevent material being milled and possibly milling bodies getting into the boundary surface between the sliding ring and the centrifugal ring. The liquid contained in the material being milled is, however, able to reach the boundary surface between both rings unimpeded and hence contributes towards lubrication and cooling.

FIG. 4 shows an alternative embodiment of the cooling and lubricating liquid supply. It is seen that the liquid passes through inlet pipe 27 and arrives in a chamber 32 of the spring guide 23, and that the counter ring 20 has bores 33 through which the liquid passes to the boundary between the two rings.

FIG. 3 shows the flange 16 with the screws 17 therein, the housing 15 and the setting screws 25 projecting into this housing. The inlet pipe 27 is shown leading into the spring guide 23 and the manner in which the spring 21 is arranged in this spring guide. Furthermore, the closing ring 26 is shown sealingly abutting against the shaft 3. Used water collects in the housing and is discharged outside through the outlet pipe 28. FIG. 3 shows, moreover, that the housing 15 has openings 15a formed therein which provide ready access to the screws 25 to reset or replace the counter rings 20 without having to open and dismantle the colloid mill.

The above described structure of the shaft packing clearly ensures that the parts to be sealed, and especially at their boundary surfaces, are adequately cooled and lubricated, which results in an extension of their life. Also the configurations of the counter ring and the spring guide permit the use of a relatively long counter ring and permit the counter ring to be reset. This feature provides a further considerable increase of the life of the short packing which means that it only needs to be replaced only after considerable periods.

The shaft packing at the outlet end of the colloidal mill is shown in FIGS. 5 and 6. The shaft 3 is shown having a rotating separator secured thereon and having two separator discs 35 and 36 and a sieve 37 between these discs; said sieve being secured to the discs by means of profile sleeves 38. The discs 35 and 36 are bolted together by means of screws 39 (only one shown) and their mutual spacing determined by spacing sleeves 40. The right-hand disc 36 has a passage 41 and a hub 42. The inside of the hub serves to receive a compression spring 43 which presses against a sliding ring holder 44. The hub exterior has a recess 46 into which an end of a gutter or bellows 47 may be fitted. The other end of the bellows is mounted in a similar recess 48 in the sliding ring holder 44. The right-hand disc 36, moreover, has a centrifugal ring 49 mounted thereon to prevent material being ground from reaching the bellows. A cup-shaped guide 50 serves on the one hand to secure, without clearance, the separators and hence the agitating vanes via spacing rings, and on the other hand to guide the sliding ring holder 44. The cup-shaped guide 50 is secured in the shaft 3 by means of a screw 51 and has openings 52 to permit the material being ground together with the liquid (which emerges through the sieve 37 and the passage 41 in the right-hand separating disc 36) to pass through this opening to reach the cup-shaped guide in the housing 53 and from there to be discharged via a pipe connectable to thread 54. A sliding ring 55 made of hard metal or preferably of ceramic material is fitted into the sliding ring holder 44. The counter ring 56 is pressed against the sliding ring 55 by means of a counter-ring spring 56a and is made of a soft material, preferably polyurethane. The counter ring 56 is several times the length of the sliding ring and in this example, may be made in one piece. The counter ring 56 is sealed both against flange 57 and relative the cylindrical housing 53 by means of sleeves 58 and 59. The flange 57 is connected to rear cover 60 of the colloid mill. The counter ring spring 56a does not press directly against the counter ring 56a but against an annular counter ring holder 61, which has a shoulder to receive the spring 56a. The sliding ring holder 44 has a centrifugal ring 61 which co-operates with the centrifugal ring 49 secured to the rear separating ring disc 36 and fulfils the same object, namely preventing the penetration of material being milled and milling bodies reaching the bellows 47 and the boundary surface between sliding ring 55 and counter ring 56. The counter ring spring 56a is supported on a centre rest 62 slidable on the housing 53. Centre rest 62 may be displaced by means of adjusting screws 63 to enable the counter ring to be reset. A cross-shaped end plate 64 is mounted to the housing 53 and is held there by being secured to the flange 57 with of screws 65. The end plate is so formed that ready access to the adjusting screws 63 is ensured. Referring to FIG. 6, and going from the outside of the figure towards the inside, there is shown the bellows 47, the sliding ring holder 44 in which the compression spring 43 is mounted, the four segments 67 of the cup-shaped guide 50 with the openings 52 and the housing 53 with its cavity. This figure clearly shows that the replacement of the counter ring 56 is very simple, in that it is necessary only to remove the cross shaped end plate 64. If this simple manipulation is compared with that of the cumbersome dismounting of parts in conventional mills, the considerable progress and advantages of the present invention can be readily appreciated.

Figure 7:
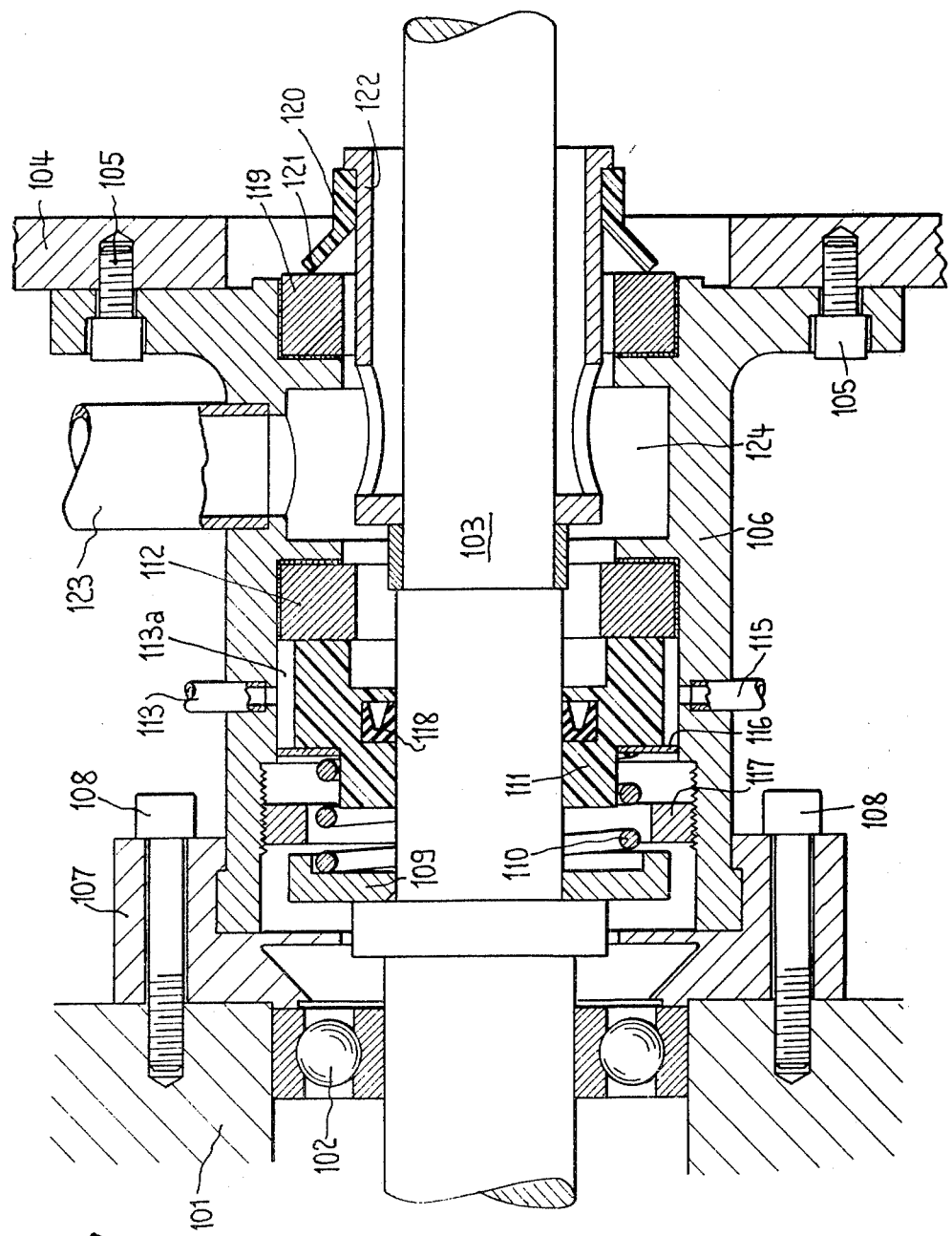
FIG. 7 is a longitudinal section through a further alternative embodiment of a shaft packing.

FIG. 7 shows a further example utilizing the shaft packing of the invention. The frame 101 is also shown in which shaft 103 is mounted by means of ball bearings 102. Shaft 103 projects through an end wall 104 of the colloid mill vessel of which only a small part is shown, and in which the grinding discs or agitator vanes are not shown. The end wall 104 is connected to the housing 106 by means of screws 105. A plate 109 is mounted on the shaft and receives compression spring 110. In contrast to the embodiment of FIG. 2, the sliding ring 111 in this example is made of a soft material, preferably polyurethane. Thus, in the present case the compression spring 110 rotates together with the sliding ring 111, whilst the counter ring 112, made of ceramics material, is rigidly connected to the housing 106. Water acting as cooling and lubricating medium flows via inlet pipe 113 into a chamber 113a between the housing and the sliding ring and on reaching the sliding ring and the counter ring operates especially in the boundary surface between these two rings and finally is discharged via the outlet pipe 115. A locking ring 116 ensures that the water is guided to the two rings and prevented from flowing away. In order to prevent cooling water from flowing-off especially during standstill of the machine, a water damming disc 117 is mounted on housing 106 beyond the sliding ring. The sliding ring 111 is sealed relative to the shaft 103 by sleeves 118.

In this embodiment the mounting and dismounting of this shaft packing is also simple. After slackening the screws 105 and 108, the housing together with the ceramic material counter ring may be removed, whereupon the sliding ring with the scraper ring, the water damming dics and the spring may be drawn-off over the shaft. The sliding ring preferably has a cut so as to facilitate its installation and removal, whereby once installed it closes again due to its resilience. One shaft packing according to the present invention is able to replace the usual two packings in conventional colloid mills.

A slip-ring 119 is mounted in the inwardly directed part of the housing and is also made of ceramics material or hard metal. This ring 119 together with an annular sealing lip 120 at its sealing edge 121, seals the vessel. The sealing lip 120 is secured to a cylindrical carrier 122. The material being ground arrives in the container via an inlet pipe 123 and inlet chamber 124.

Figure 1:
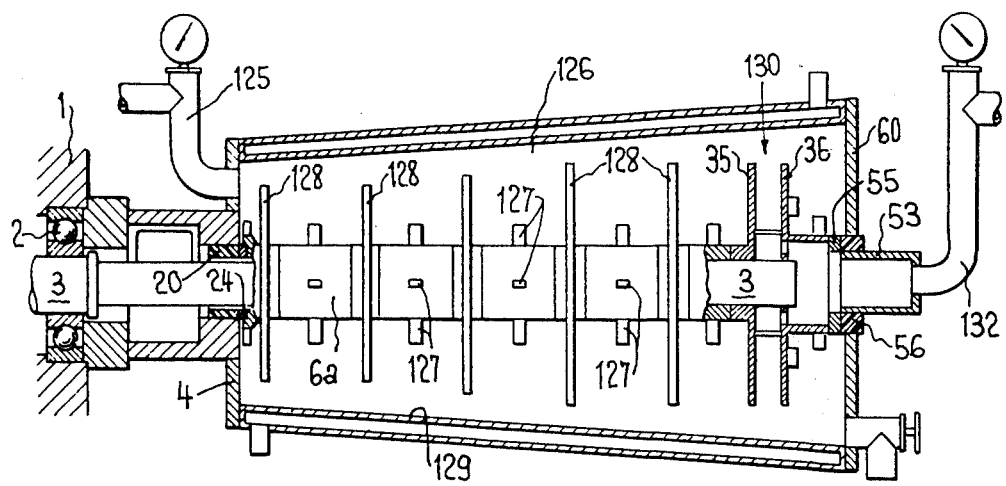
FIG. 1 is a partial schematic section of a colloid mill.

In FIG. 1 an example of application for the shaft packings is shown schematically in accordance with FIGS. 2 to 6. Comparison of this schematic sketch with a diagram of conventional colloid mills shows on the one hand that only two shaft packings are now required and on the other hand that the present shaft packings have a substantially longer life than conventional ones and are readily reset and replaced. Consequently the direction of throughflow of the material being ground can be opposite, i.e. in direction of the opening cone. Together with adjustable agitating discs or agitating vanes known per se, this reversal of the throughflow direction of the material being ground provides a higher degree of efficiency. It is, however, also possible to leave the direction of through-flow in the conventional direction, i.e. towards the tapering end of the cone.

In the embodiment in accordance with FIG. 1, the material being ground is introduced by means of suitable pumps through a central inlet pipe 125 into the grinding container 126; said grinding container may be partially filled with milling bodies depending upon the intended use.

The agitating disc shaft 3 rotates at high speed, and the agitating discs 128 or agitating vanes, which may also be adjustable, cause the material to be ground and, possibly, the grinding bodies to be subjected to a radial acceleration in the direction of the wall of the milling container. By suitable selection of the peripheral speed, the shape and possibly the setting angle of the agitating discs or agitating vanes, an optimal fineness of the material to be milled and a reduced treatment time may be attained. Furthermore, milling without milling body material is possible for certain materials. The milling effect is additionally increased by centrifugal cams 127 or centrifugal discs being mounted on the spacing members 6a, and the material being milled and the milling bodies are additionally agitated. Moreover, these centrifugal cams more especially prevent the milling bodies from attacking the shaft. Both the agitating discs and the inside walls 129 of the container may be lined with abrasion-proof material, such as ceramics material. After passing-through the milling zone, the material to be milled leaves the milling container 126 through the rotary separator 130 and through the housing chamber 53 with discharge pipe 132.

A further substantial increase of the operating life is attained in that the material being milled and/or the milling bodies are prevented from reaching the contact surfaces of the sliding and counter ring.

Figure 8:
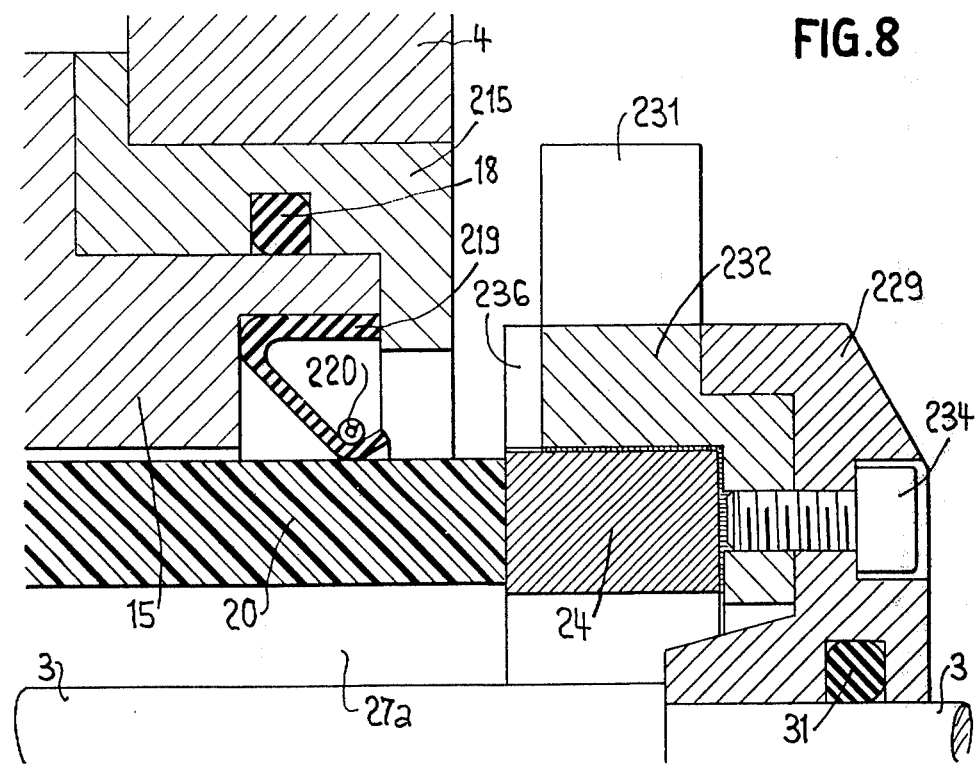
FIG. 8 is an enlarged fragmentary section of a further embodiment of a shaft packing.

FIG. 8 shows a modification of FIG. 2 for mounting counter ring 20 and sliding ring 24. The end wall 4 and the housing 15 are shown with a new feature of a guard ring 215 to retain and protect the packing 219. The guard ring 215 is sealed relative to the housing 15 by an O-ring 18. The packing 219 is angled twice and is conveniently made of a plastics material such as "Teflon" (a Registered trademark) or the like. Packing 219 is held by the guard ring 215 and pressed by the spring ring 220 against the counter ring 20. The counter ring thus gains a greater freedom of movement which is of considerable importance especially with materials which swell with long use since, under certain circumstances, the resetting and replacement of the counter ring can be obstructed. Moreover, the cooling chamber 27a and indicated shaft 13 are shown.

The sliding ring 24 is retained by a two-part sliding ring holder 229 and 232. The two holder parts are held together by screws 234 and sealed relative to the shaft 3 by an O-ring 31. Alternatively, the two parts may also be integrally formed. The second part 232 is also serves as the centrifugal ring which is intended to keep the material being milled away from the contact surfaces between the sliding and counter rings so as to reduce the wear of the rings. To increase the centrifugal effect, grooves are milled out along the circumference, so that a plurality of radial centrifugal blades 231 are formed, especially as shown in FIG. 9.

Figure 9:
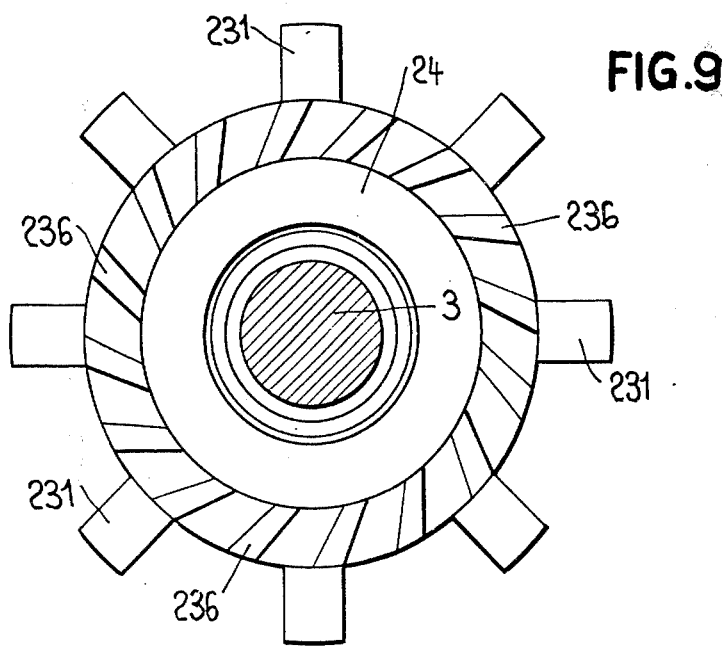
FIG. 9 is a view of the left end of a sliding ring holder shown in FIG. 8.

Also, as shown in FIG. 9, the end face of second part 232 has been milled into so as to produce a plurality of rifugal blades 236 which are angled relative to the radial direction.

The shaft packing is particularly suitable for colloid mills with agitating blades or vanes which are secured in a pivotal holder. For comminuting certain materials such as fabrics, it may, moreover, be advantageous to use agitating knives instead of known agitating vanes which are secured in the same manner to a pivotal holder and to the boss.

Even whilst the shaft packings which are adjustable from the outside as per FIG. 2 or 5 are particularly advantageous, it is quite possible to use shaft packings which are replaceable from the inside. A common feature of all these shaft packings, however, is the combination of hard material, such as hard metal or ceramics, with a soft material such as carbon or plastics material and the lubrication and/or cooling of the sealing or packing rings and especially at the boundary surfaces of both rings frictionally engaged on each other. To facilitate the replacement of the hard packing rings, they may be made in two parts.

Different alternative embodiments of shaft packings are conceivable. Thus, it is also conceivable in shaft packings in accordance with FIGS. 2 and 5, for the roller and the material of the sliding and counter rings to be interchanged or that universal joints are used instead of compression springs, or that other sealing rings, for example, O-rings are chosen instead of sleeves.

The hardness of the two rings of the embodiments described fall within the ranges specified in the accompanying claims.

What I claim is:

1. A shaft packing for a shaft that extends into a vessel of a mill, such as an agitating mill and a colloidal mill, the shaft and vessel being mounted for rotation relative to each other, said shaft packing comprising
   a shaft packing housing;
   a sliding ring;
   a counter ring mounted in sealing engagement with said sliding ring;
   wherein one of the said sliding and said counter rings is mounted on the shaft and the other is fixed with respect to the vessel, and one is made of a hard material having a Vickers hardness of at least 1000 kp/mm$^2$ and the other is made of a soft material having a maximum hardness of 100 Shores; and further comprising means for displaceably and adjustably mounting said counter ring, said mounting means being in turn mounted on said housing such that said counter ring can be displaced and adjusted from outside the vessel without having to dismantle the shaft packing;

means for applying spring pressure to press said counter ring against said sliding ring;

means for supplying a cooling and lubricating liquid to said sliding and counter rings at the surfaces thereof in contact with each other; and a sliding ring holder having at least one end face for mounting said sliding ring, said holder having protecting means mounted thereon for keeping the material to be milled and the milling bodies, if used in the mill, away from the contacting surfaces of said sliding and counter rings.

2. A shaft packing as claimed in claim 1 wherein said sliding ring is made of the hard material and the counter ring is made of the soft material; and wherein said counter ring has an axial length greater than said sliding ring.

3. A shaft packing according to claim 1 wherein said sliding ring is made of a soft material and said counter ring is made of a hard material.

4. A shaft packing according to claim 1 wherein said sliding ring is made of a hard material and is securely connected to the shaft and wherein the counter ring is made of a soft material.

5. A shaft packing according to claim 4 wherein said sliding ring is made of a sintered hard metal and said counter ring is made of a soft plastics material.

6. A shaft packing as claimed in claim 2 wherein said protecting means comprises centrifugal blades mounted on the periphery of said holder, said blades being for keeping the material to be milled and the milling bodies, if used in the vessel, away from the contacting surfaces of said sliding and counter rings.

7. A shaft packing as claimed in claim 6 and further comprising a shaft packing housing;

an angled, resilient packing located in sealing relationship between said counter ring and said housing; and a spring ring pressing said resilient packing against said counter ring.

8. A shaft packing as claimed in claim 6 and further comprising futher centrifugal blades integrally mounted on said ring holder end face, said further blades forming an angle relative to the radial direction.

9. A shaft packing as claimed in claim 1 wherein said sliding ring is made of a hard material and further comprising a sliding ring holder slidingly mounted on the shaft for receiving said sliding ring;

a compression spring acting on said sliding ring holder so as to press said sliding ring against said counter ring; and a deformable bellows covering said compression spring.

10. A shaft packing according to claim 4 wherein said sliding ring is made of ceramics material and said counter ring is made of polyurethane.

11. A shaft packing as claimed in claim 2 wherein said supplying means comprises an inlet pipe, an enclosed chamber extending along said counter ring and in communication with said inlet pipe, and a closing ring closing one end of said chamber for enabling the pressurization of the liquid; said sliding ring being made of the soft material.

12. A shaft packing as claimed in claim 1 and further comprising a spring guide engaging the end of said counter ring away from said sliding ring, said spring guide having a chamber therein; and wherein said supplying means comprises an inlet pipe in communication with said chamber, and said counter ring is made of the soft material and has bores formed therein in communication with said chamber and with the boundary surface between said counter ring and said sliding ring to receive said liquid and conduct it to the boundary surface.

13. A shaft packing as claimed in claim 2 wherein the side of said shaft packing housing distal from the vessel has openings therein so as to enable said counter ring to be adjusted and removed.

14. A shaft packing according to claim 1 wherein said counter ring is made of soft material and is comprised of two parts.

15. A shaft packing according to claim 1 wherein said counter ring is made of a hard material and is comprised of two parts.

16. A shaft packing as claimed in claim 1 wherein said vessel is a colloidal mill; and further comprising a further shaft packing, the colloidal mill having only two said shaft packings, one located on the driving side and one located on the driven side, said shaft packing at the driving side further comprising a counter ring made of the soft material, means for mounting said counter ring such that said counter ring is adjustable from outside of the colloidal mill, a sliding ring made of the hard material, a compression spring means pressing said counter ring against said sliding ring, and means for securely connecting said sliding ring to the shaft; and said shaft packing at the outlet side further comprising said counter ring made of the soft material, means for mounting said counter ring such that said counter ring is adjustable from outside of the colloidal mill, spring means for subjecting said counter ring to spring pressure, said sliding ring made of the hard material, and spring means for subjecting said sliding ring to spring pressure.

17. A shaft packing as claimed in claim 16 wherein said colloidal mill is horizontally disposed, is comprised of a conical milling container, and has the material being milled flowing in the direction of the widening cone.

18. A shaft packing as claimed in claim 16 wherein said colloidal mill comprises agitating blades and a holder means for pivotally securing said blades to the rotating shaft.

19. A shaft packing as claimed in claim 1 wherein the vessel is stationary and the shaft rotates and wherein both said sliding ring and said counter ring are annular, in coaxial alignment, and surround the shaft; and said shaft packing further comprising a shaft packing housing surrounding the shaft and rigidly attached to the vessel;

first means for rigidly mounting said sliding seal to said shaft for rotation therewith, second means for rigidly mounting said counter seal to said shaft packing housing and for mounting one end of said counter seal in engagement with one end of said sliding seal wherein at least one of said first and second mounting means comprises an annular spring guide surrounding the shaft and in abutting engagement with the other end of said sliding seal and said counter seal, respectively;

wherein one of said sliding ring and said counter ring has an axial length at least twice as long as the other and extends along said shaft outside said vessel so that it is accessible from outside of said vessel; and wherein said shaft packing further comprises a spring means acting on said spring guide for urging said sliding seal and said counter seal into sealing engagement, said spring means comprising an elongate compression spring which engages said spring guide at one end and comprises a spring locking ring which engages said spring at the other end thereof; and means for removably attaching siad spring locking ring to said shaft if said first mounting means is comprised of said spring guide and to said housing if said second mounting means is comprised of said spring guide.

20. A shaft packing for a shaft that extends into a vessel, the shaft and vessel being mounted for rotation relative to each other and the shaft packing being especially for use in a mill such as an agitating mill and a colloidal mill, said shaft packing comprising an annular sliding ring surrounding the shaft;

first means for rigidly mounting said sliding ring to the shaft;

a shaft packing housing surrounding the shaft and rigidly attached to the vessel;

an annular counter ring surrounding the shaft; and second means for mounting said counter ring in coaxial end to end sealing engagement with said sliding ring and for mounting said counter ring to said housing, said second mounting means comprising an annular spring guide surrounding the shaft and in abutting engagement at one side thereof with the other end of the counter seal that is distal from the one end engaging said sliding ring; wherein said housing is comprised of a forward annular portion the inside of which is in sealing engagement with the outside of said counter ring proximal to said one end of said counter ring, and a rearward portion integral with said forward portion and having openings in the periphery thereof so as to provide access to said spring guide and said counter ring;

said shaft packing further comprising means for removably, rigidly attaching said housing to the vessel; and a spring means acting on said spring guide for urging said sliding seal and said counter seal into sealing engagement, said spring means comprising an elongated compression spring which surrounds the shaft and which at one end thereof engages said spring guide at the other end thereof, a spring locking ring engaging the other end of said spring, and means for removably, rigidly attaching said spring locking ring to said housing; and wherein one of said sliding ring and said counter ring has an axial length at least twice as long as the other and extends along said shaft outside of said vessel so that it is accessible from outside of said vessel.

* * * * *